United States Patent
Kloos (10) Patent No.: US 7,693,284 B2
(45) Date of Patent: Apr. 6, 2010

(54) METHOD AND APPARATUS FOR ENCRYPTION OF OVER-THE-AIR COMMUNICATIONS IN A WIRELESS COMMUNICATION SYSTEM

(75) Inventor: Michael Kloos, Belvidere, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/947,724

(22) Filed: Sep. 23, 2004

(65) Prior Publication Data

US 2006/0062319 A1    Mar. 23, 2006

(51) Int. Cl.
    H04F 9/00    (2006.01)
(52) U.S. Cl. ...................... 380/270; 713/151
(58) Field of Classification Search ......... 380/270–272; 713/151
    See application file for complete search history.

(56) References Cited

U.S. PATENT DOCUMENTS

| | | | |
|---|---|---|---|
| 6,157,679 A | 12/2000 | Johnson | |
| 2002/0067777 A1* | 6/2002 | Jeong | 375/324 |
| 2003/0133570 A1* | 7/2003 | Candelore et al. | 380/210 |
| 2004/0022171 A1* | 2/2004 | Ko | 369/275.3 |
| 2005/0008097 A1* | 1/2005 | Tjhung et al. | 375/302 |
| 2005/0190868 A1* | 9/2005 | Khandekar et al. | 375/346 |
| 2005/0201473 A1* | 9/2005 | Lakkis | 375/260 |
| 2006/0013121 A1* | 1/2006 | Jiang | 370/207 |
| 2006/0013330 A1* | 1/2006 | Ha | 375/267 |

OTHER PUBLICATIONS 802. 15.3, IEEE Std 802.15.3-2003, IEEE Standard for Information technology, Telecommunications and information exchange between systems- Local and metropolitan area networks-Specific requirements, Part 15.3: Wireless Medium Access Control (MAC) and Physical Layer (PHY) Specifications for High Rate Wireless Personal Area Networks (WPANs), IEEE Computer Society Sep. 29, 2003, pp. 1-324.

* cited by examiner

*Primary Examiner*—Gilberto Barron, Jr.
*Assistant Examiner*—Venkat Perungavoor
(74) *Attorney, Agent, or Firm*—Steven A. May (57) ABSTRACT

A communication device encrypts symbols at a physical layer in order to improve encryption of data transmitted over a wireless link. A symbol mapper of the communication device receives a bit stream comprising multiple bits and maps the multiple bits to multiple symbols. An amplitude and phase adjuster of the communication device receives the multiple symbols and encrypts the symbols by applying at least one of a phase shift and an amplitude adjustment to each symbol of the multiple symbols to produce multiple encrypted symbols for transmission over a wireless link. In another embodiment of the present invention, a communication device is provided that is able to decrypt the encrypted symbols by applying at least one of a phase shift and an amplitude adjustment to each encrypted symbol that corresponds to a phase shift or an amplitude adjustment applied to the symbol by a transmitting communication device.

22 Claims, 6 Drawing Sheets

| | | | | | | | | | | |
|---|---|---|---|---|---|---|---|---|---|---|
| 701 → $f_1$ | S | S | S | D | D | D | D | D | P | ... |
| 702 → $f_2$ | S | S | S | D | D | P | D | D | D | ... |
| 703 → $f_3$ | S | S | S | D | D | P | D | D | D | ... |
| 704 → $f_4$ | S | S | S | D | D | D | D | D | P | ... |

METHOD AND APPARATUS FOR ENCRYPTION OF OVER-THE-AIR COMMUNICATIONS IN A WIRELESS COMMUNICATION SYSTEM

CROSS-REFERENCE TO RELATED APPLICATION(S)

This application is related to U.S. patent application Ser. No. 11/209,058, filed on the same date as this application.

FIELD OF THE INVENTION

The present invention relates generally to wireless communication systems, and more specifically to encryption of over-the-air communications in a wireless communication system.

BACKGROUND OF THE INVENTION

In a typical wireless communication system, a session key is distributed among the transmitting and receiving communication devices when a communication session is set up. The session key is then used by the transmitting communication to perform Layer 2 or Layer 3 encryption on data transmitted over-the-air. No physical layer, that is, Layer 1, encryption is performed, that is, there is no encryption of the modulated waveform. In addition, typically only the user data is encrypted and not the pilot symbols and synchronization symbols, which symbols must be used as a reference for timing synchronization and fading recovery.

The performance of Layer 2 or Layer 3 encryption leaves the data vulnerable to decryption by an intercepting communication device that either intercepts the session key or that decrypts the data by application of brute force. Therefore, a need exists for a method and apparatus that makes an air interface more secure against decryption by an undesired interceptor of a communication in a wireless communication system.

DETAILED DESCRIPTION OF THE INVENTION

To address the need for a method and apparatus that makes an air interface more secure against decryption by an undesired interceptor of a communication in a wireless communication system, a communication device is provided that encrypts symbols at a physical layer in order to improve encryption of data transmitted over a wireless link. A symbol mapper of the communication device receives a bit stream comprising multiple bits and maps the multiple bits to multiple symbols. An amplitude and phase adjuster of the communication device receives the multiple symbols and encrypts the symbols by applying at least one of a phase shift and an amplitude adjustment to each symbol of the multiple symbols to produce multiple encrypted symbols for transmission over a wireless link. In another embodiment of the present invention, a communication device is provided that is able to decrypt the encrypted symbols by applying at least one of a phase shift and an amplitude adjustment to each encrypted symbol that corresponds to a phase shift or an amplitude adjustment applied to the symbol by a transmitting communication device.

Generally, an embodiment of the present invention encompasses a method for encrypting a wireless transmission. The method includes receiving multiple symbols, applying at least one of a phase shift and an amplitude adjustment to each symbol of the multiple symbols to produce multiple adjusted symbols, and transmitting the plurality of adjusted symbols via a wireless link.

Another embodiment of the present invention encompasses a method for receiving an encrypted wireless transmission. The method includes receiving multiple encrypted symbols via a wireless link, wherein each symbol of the multiple encrypted symbols has been encrypted by an application of at least one of a phase shift and an amplitude adjustment to the symbol, and applying at least one of a phase shift and an amplitude adjustment to each encrypted symbol of the plurality of encrypted symbols to produce multiple decrypted symbols.

Yet another embodiment of the present invention encompasses a communication device that includes a symbol mapper that receives a bit stream comprising multiple bits and that maps the multiple bits to multiple symbols. The communication device further includes an amplitude and phase adjuster that receives the multiple symbols from the symbol mapper and applies at least one of a phase shift and an amplitude adjustment to each symbol of the multiple symbols to produce multiple adjusted symbols for transmission over a wireless link.

Still another embodiment of the present invention encompasses a communication device that includes an amplitude and phase adjuster that receives multiple encrypted symbols that have been transmitted over a wireless link, wherein each symbol of the multiple encrypted symbols has been encrypted by an application of at least one of a phase shift and an amplitude adjustment to the symbol, and applies at least one of a phase shift and an amplitude adjustment to each encrypted symbol of the multiple encrypted symbols to produce multiple decrypted symbols. The communication device further includes an inverse symbol mapper that receives the multiple decrypted symbols and maps each decrypted symbol of the multiple decrypted symbols to a point in a constellation to produce a bit stream.

Figure 1:
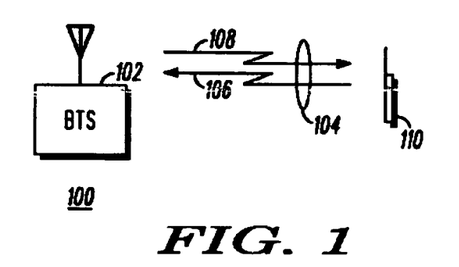
FIG. 1 is a block diagram of a wireless communication system in accordance with an embodiment of the present invention.

The present invention may be more fully described with reference to FIGS. 1-8. FIG. 1 is a block diagram of a wireless communication system 100 in accordance with an embodiment of the present invention. Communications system 100 includes a base transceiver station (BTS) 102 that is capable of engaging in wireless communications with a mobile station (MS) 110, such as a cellular telephone, radiotelephone, or wireless data modem, via an air interface 104. Air interface 104 includes a forward link 108 that comprises traffic, pilot, paging, and signaling channels. Air interface 104 further includes a reverse link 106 that comprises traffic, access, and signaling channels.

Figure 2:
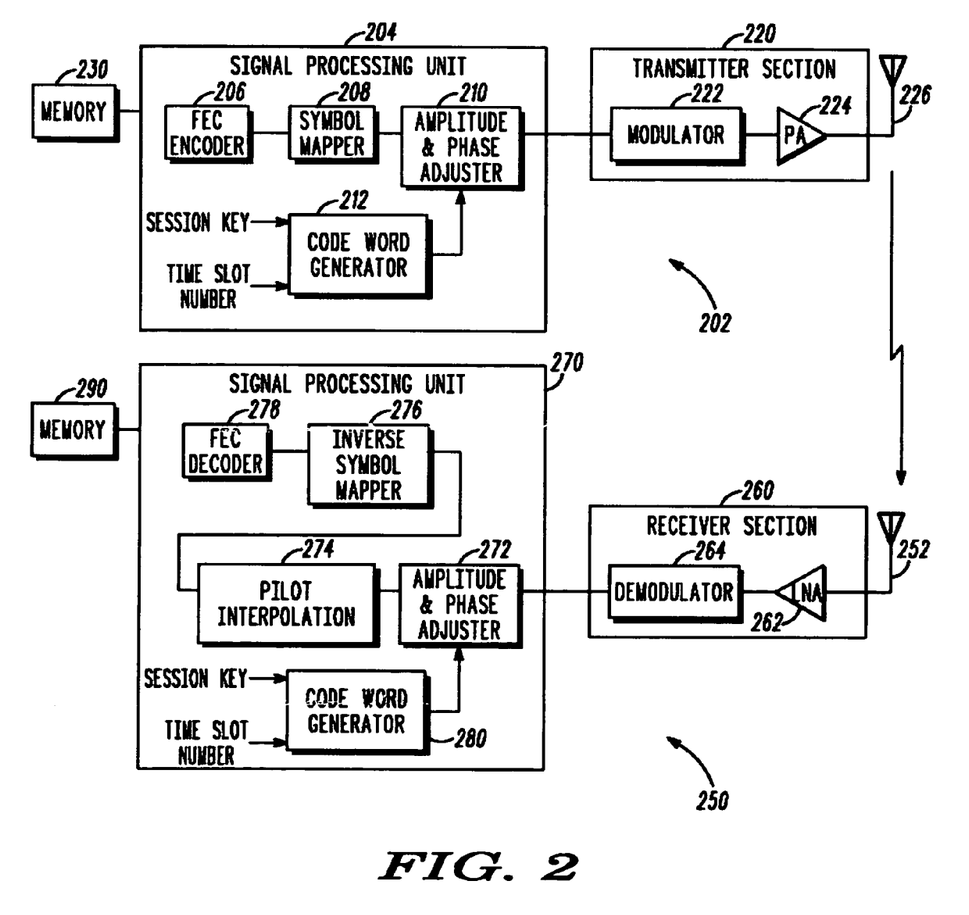
FIG. 2 is a block diagram of an architecture of the communication system of FIG. 1 in accordance with an embodiment of the present invention.

FIG. 2 is a block diagram of an architecture 200 of communication system 100. On a transmit side of communications system 100, a transmitting communication device 202, such as BTS 102, receives a bit stream, converts the bit stream to a corresponding symbol stream, provides encryption at a physical layer by encrypting the symbol stream to produce an encrypted symbol stream, and transmits the encrypted symbol stream via an air interface, such as air interface 104. On a receive side of communications system 100, a receiving communication device 250, such as MS 110, receives the transmitted, encrypted symbol stream and provides decryption at a physical layer by decrypting the received symbols to recover the bits of the transmitted bit stream corresponding to each received data symbol. However, those who are of ordinary skill in the art realize that BTS 102 and MS 110 are each capable of operating as either a transmitting communication device or a receiving communication device with respect to the embodiments of the present invention.

Each of transmitting communication device 202 and receiving communication device 250 includes a respective signal processing unit 204, 270, such as one or more microprocessors, microcontrollers, digital signal processors (DSPs), combinations thereof or such other devices known to those having ordinary skill in the art. As those who are of ordinary skill in the art are aware, various functions of signal processing units 204, 270 as described herein may alternatively be implemented in hardware circuitry, such as a programmable logic array (PLA) or an application specific integrated circuit (ASIC). Signal processing unit 204 includes a Forward Error Correction (FEC) encoder 206, a symbol mapper 208 coupled to the encoder, an amplitude and phase adjuster 210 coupled to the symbol mapper, and a code word generator 212 coupled to the amplitude and phase adjuster. Signal processing unit 270 includes an amplitude and phase adjuster 272, a pilot interpolation function 274 and a code word generator 280 that are each coupled to the amplitude and phase adjuster, an inverse symbol mapper 276 coupled to the pilot interpolation function, and an FEC decoder 278 to the inverse symbol mapper.

Each of transmitting communication device 202 and receiving communication device 250 further includes a respective at least one memory device 230, 290 associated with the respective signal processing unit, such as random access memory (RAM), dynamic random access memory (DRAM), and/or read only memory (ROM) or equivalents thereof, that maintains data and programs that may be executed by the signal processing unit and that allow the signal processing unit to operate in communication system 100. Each of transmitting communication device 202 and receiving communication device 250 further maintains in their respective at least one memory device 230, 290 a session key that is exchanged by the transmitting and receiving communication devices during a set up of a communication session between the two devices as is known in the art. Each of transmitting communication device 202 and receiving communication device 250 may further maintain, in their respective at least one memory device 230, 290, a mobile serial number that is uniquely associated with MS 110. When communication system 100 is a Time Division Multiple Access communication system, each of transmitting communication device 202 and receiving communication device 250 may further maintain in their respective at least one memory device 230, 290 a time slot number that is assigned to MS 110 during a set up of the communication session as is known in the art.

Figure 3:
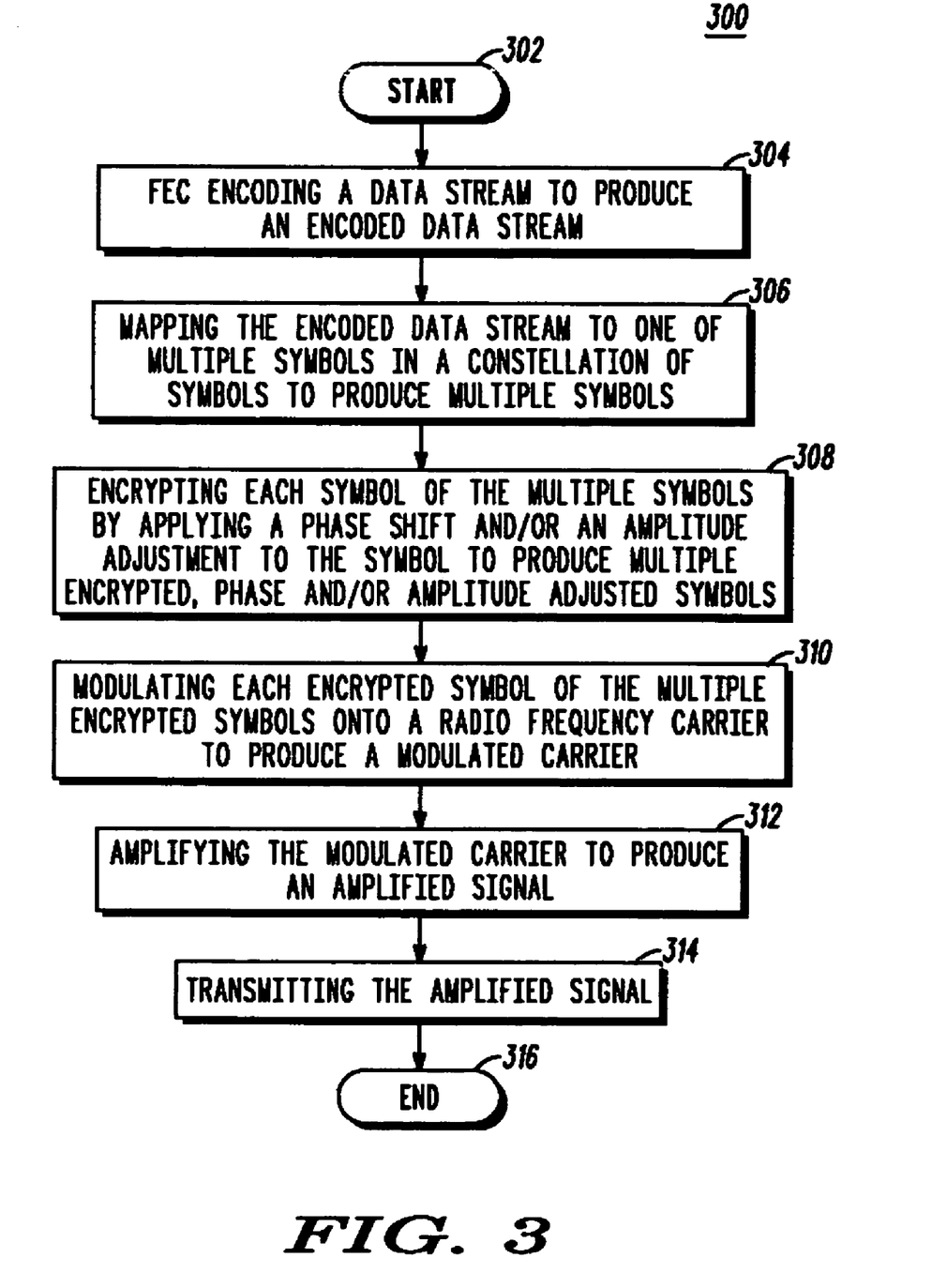
FIG. 3 is a logic flow diagram illustrating an operation of the transmitting communication device of FIG. 2 in accordance with an embodiment of the present invention.

FIG. 3 depicts a logic flow diagram 300 that illustrates an operation of transmitting communication device 202 in communication system 100 in accordance with an embodiment of the present invention. Referring now to FIGS. 2 and 3, logic flow 300 begins (302) when a data source (not shown) provides a stream of data, preferably in a binary format such as bits, to signal processing unit 204, which data stream may include virtually anything capable of being represented in a digital format including, but not limited to, voice and image data. Signal processing unit 204 routes the data to encoder 206. Encoder 206 applies an error correcting code, preferably a forward error correction code (FEC), to the data. For example, encoder 206 may encode the data by use of a convolutional code such as a Viterbi coding algorithm, however, a block code may be used. Convolutional codes and block codes are well known in the art and will not be described in greater detail. The type of error correcting code used is not critical to the invention and those of ordinary skill in the art are aware of many types of error correction codes that may be applied to the data without departing from the spirit and scope of the present invention. Regardless, the output of encoder 206 includes information preferably represented in a binary data (bits) format.

A data stream output by encoder 206 is then provided to symbol mapper 208. However, in another embodiment of the present invention, the data stream provided by the data source may be entered directly to symbol mapper 208. In yet another embodiment of the present invention, signal processing unit 204 may further include an interleaver that interleaves the encoded data prior to the encoded data being conveyed by encoder 206 to symbol mapper 208.

Symbol mapper 208 maps (306) the encoded data to one of multiple symbols included in a constellation of symbols to produce a symbol stream comprising multiple symbols corresponding to the encoded data. Preferably, symbol mapper 208 utilizes a quadrature amplitude modulation (QAM) mapping scheme for mapping the data. However, the mapping scheme used is not critical to the present invention and those who are of ordinary skill in the art realize that a wide variety of mapping schemes, such a binary phase shift keying (BPSK) or quadrature phase shift keying (QPSK), may be used herein without departing from the spirit and scope of the present invention.

In order to map the data stream, symbol mapper 208 groups the input data stream into groups of P binary data units, such as data bits, to form multiple P-tuples. Symbol mapper 208 then modulates each of the multiple P-tuples by mapping the P-tuple to a corresponding point out of M possible points, wherein $M=2^P$, in a predetermined QAM constellation. To this end, the predetermined QAM constellation that includes the M possible points is defined within a multi-dimensional space, preferably a complex two-dimensional (I/Q) space. Each point within the two-dimensional space may be thought of as a vector sum of two scaled basis vectors. The two scaled basis vectors respectively correspond to an in-phase (I) component and a quadrature (Q) component of the constellation point, or corresponding data symbol. The respective amplitudes of the two basis vectors used to define a particular point may be thought of as two-dimensional coordinates (I,Q) of the point. However, those who are of ordinary skill in the art realize that each point in the constellation may alternatively be represented by a corresponding magnitude and phase. After modulation of each P-tuple by symbol mapper 208, the symbol mapper conveys the resulting symbols to amplitude and phase adjuster 210.

Amplitude and phase adjuster 210 then encrypts (308) each symbol received by the amplitude and phase adjuster by applying at least one of a phase shift 'θ' and an amplitude adjustment 'A' to the symbol to produce an encrypted, phase and/or amplitude adjusted symbol. Preferably the phase and/or amplitude adjustment is based on the session key exchanged by transmitting communication device 202 and receiving communication device 250 during set up of a communication session and maintained in their respective at least one memory device 230, 290. When communication system 100 is a Time Division Multiple Access (TDMA) communication system, the phase and/or amplitude adjustment may be further based on a time slot number assigned to MS 110.

More specifically, each phase shift 'θ' and amplitude adjustment 'A' applied by amplitude and phase adjuster 210 is based on a code word generated by code word generator 212. In one embodiment of the present invention, code word generator 212 comprises an encryption algorithm, such as an Advanced Encryption Standard (AES) algorithm, or an A5/3 or a GEA3 encryption algorithm as described in 3GPP (third Generation Partnership Project) TS (Technical Specification) 55.216 v6.2.0, which technical specification is hereby incorporated by reference herein, that is executed by signal processing unit 204. The inputs to the algorithm comprise the session key or a derivation of the session and may further comprise the time slot number or a derivation of the time slot number, such as a hashed version of the time slot number. Phase shift 'θ' and amplitude adjustment 'A' are then derived from the corresponding output of the encryption algorithm. For example, a phase shift 'θ' or an amplitude adjustment 'A' applied to a symbol by amplitude and phase adjuster 210 may be based on a first 'n' bits output by the encryption algorithm, or the phase shift 'θ' may be based on the first 'n' bits output by the encryption algorithm and the amplitude adjustment 'A' may be based on a next 'm' bits output by the algorithm.

For example, suppose 'n'=4. In correspondence with a symbol input to amplitude and phase adjuster 210, the amplitude and phase adjuster reads 4 bits output by code word generator 212. By reading 4 bits a time, communication system 100 is able to implement phase shift increments of '360°/$2^n$', or 22.5°. A phase shift 'θ' applied by amplitude and phase adjuster 210 may then be 'N×(360°/$2^n$),' where 'N' is a value corresponding to the 'n' bits. For example, suppose the 'n' bits read out by signal processing unit 204 are '1001.' These bits correspond to a value of '9,' that is, N=9. As a result, the corresponding phase shift 'θ' applied by amplitude and phase adjuster 210 may be '9×22.5,' or 202.5°. As a result, if the symbol input to amplitude and phase adjuster 210 has a phase, 'φ,' of 45°, a corresponding phase shifted symbol output by amplitude and phase adjuster 210 has a phase of 'φ+θ,' that is, 247.5°. Similarly, when 'n' (or 'm')=4, the 'n' (or 'm') bits may be used to determine an amplitude adjustment of a symbol. For example, when the bits correspond to a value of '9,' this value may be used to determine a fractional, or a percentage, change in the amplitude. Innumerable algorithms for adjusting a phase or an amplitude of a symbol based on a code word output by code word generator 212 may occur to one of ordinary skill in the art, and any such algorithm may be used herein without departing from the spirit and scope of the present invention.

For each successive symbol input into amplitude and phase adjuster 210, the amplitude and phase adjuster reads a next successive 'n' bits, or 'n+m' bits, whichever is appropriate, output by code word generator 212. In order to implement these phase and amplitude adjustments, amplitude and phase adjuster 210 may comprise a buffer that stores the code word output by code word generator 212 and from which the amplitude and phase adjuster may read the 'n,' or 'n+m', bits.

When the communication session between transmitting communication device 202 and receiving communication device 250 is set up, signal processing unit 204 initializes code word generator 212 by inputting the session key, typically a string of bits, or a string of bits derived from the session key, and/or the time slot number, or a string of bits derived from the time slot number, such as a hashed version of the time slot number, into code word generator 212. In correspondence with each symbol input into amplitude and phase adjuster 210, amplitude and phase adjuster 210 reads 'n', or 'n+m', bits of the output of code word generator 212. The values 'n' and 'm' are maintained in the at least one memory device 230, 290 of each of the transmitting and receiving communication devices 202, 250. Signal processing unit 204 then determines a phase shift 'θ' or an amplitude adjustment 'A' based on the read 'n' bits, or a phase shift 'θ' based on the 'n' bits and an amplitude adjustment 'A' based on a next 'm' bits of the code word.

In another embodiment of the present invention, code word generator 212 may comprise a shift register, such as a Linear Feedback Shift Register (LFSR), that is maintained in signal processing unit 204 or at least one memory device 230. When the communication session between transmitting communication device 202 and receiving communication device 250 is set up, signal processing unit 204 writes the session key, or a string of bits derived from the session key, and may further write the time slot number, or a string of bits derived from the time slot number, into the shift register. In correspondence with each symbol input into amplitude and phase adjuster 210, signal processing unit 204 then reads 'n,' or 'n+m,' bits of the shift register, preferably the 'n,' or 'n+m,' least significant bits in shift register 212. Each time signal processing unit 204 reads 'n,' or 'n+m,' bits from shift register 212, the signal processing unit then shifts the bits in the shift register by one or more bits before reading out a value corresponding to a next phase and/or amplitude adjustment and writes in one or more new most significant bits. A shift register algorithm corresponding to the shifting of the shift register, that is, to a number of bits that shift register is shifted each time a phase and/or amplitude adjustment is read out, and to how to determine a new one or more most significant bits, may be maintained in the at least one memory device 230, 290 of each of the transmitting and receiving communication devices 202, 250. Many such algorithms are known, and the particular algorithm used herein is not critical to the present invention.

Figure 4:
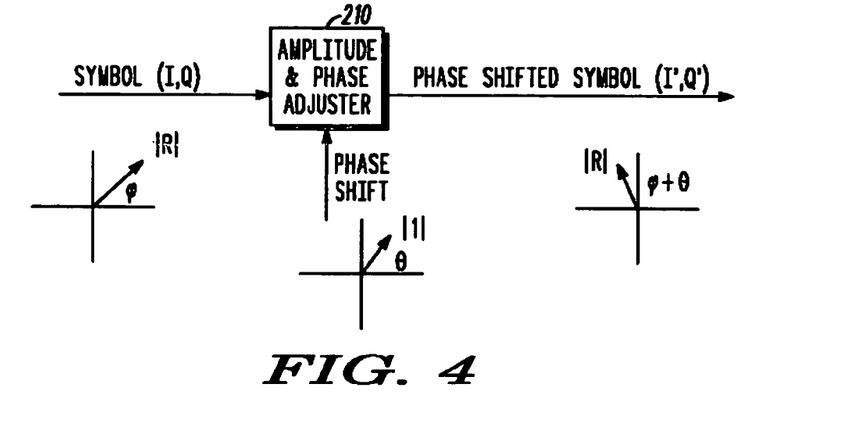
FIG. 4 is a graphical illustration of an operation of the amplitude and phase adjuster of the transmitting communication device of FIG. 2 in accordance with an embodiment of the present invention.

In order to assist the reader in understanding the present invention and merely for the purpose of illustrating the principles of the present invention and not intended to limit the invention in any way, a graphical illustration of a phase shift applied to a symbol by amplitude and phase adjuster 210 is depicted by FIG. 4. A symbol (I,Q) input into amplitude and phase adjuster 210 is shown as having a magnitude of |R| and a phase of φ. A code word corresponding to a phase shift 'θ' is output by shift register 212 and input to amplitude and phase adjuster 210. Amplitude and phase adjuster 210 then outputs a phase shifted symbol (I',Q') that has a magnitude of |R| and a phase of 'φ+θ.'

As is known in the art, data is transmitted over the air in groupings known as frames. After the communication session is set up, each time transmitting communication device 202 starts a new frame, signal processing unit 204 re-initializes code word generator 212 so that the first, in time, symbols encrypted for embedding in the new frame are encrypted based on the re-initialized code word generator. The header of the new frame includes a New Frame Indicator (NFI), indicating that this is a new frame, and the NFI indicates to receiving communication device 250 that the receiving communication device should re-initialize its code word generator as well. Thus synchronization is maintained between the respective code word generators 212, 280 of the transmitting and receiving communication devices 202, 250.

Amplitude and phase adjuster 210 conveys each phase and/or amplitude adjusted symbol to a transmitter section 220 of transmitting communication device 202 that is coupled to signal processing unit 204. Transmitter section 220 includes a modulator 222 coupled to an amplifier 224. Transmitter section 220 routes the phase and/or amplitude adjusted symbol to modulator 222. Modulator 222 modulates (310) each encrypted, phase and/or amplitude adjusted symbol onto a radio frequency (RF) carrier to produce a modulated carrier and conveys the modulated carrier to amplifier 224. Amplifier 224 amplifies (312) the modulated carrier produce an amplified signal and then transmits (314) the amplified signal via an antenna 226 and air interface 106. Logic flow 300 then ends (316).

Figure 5:
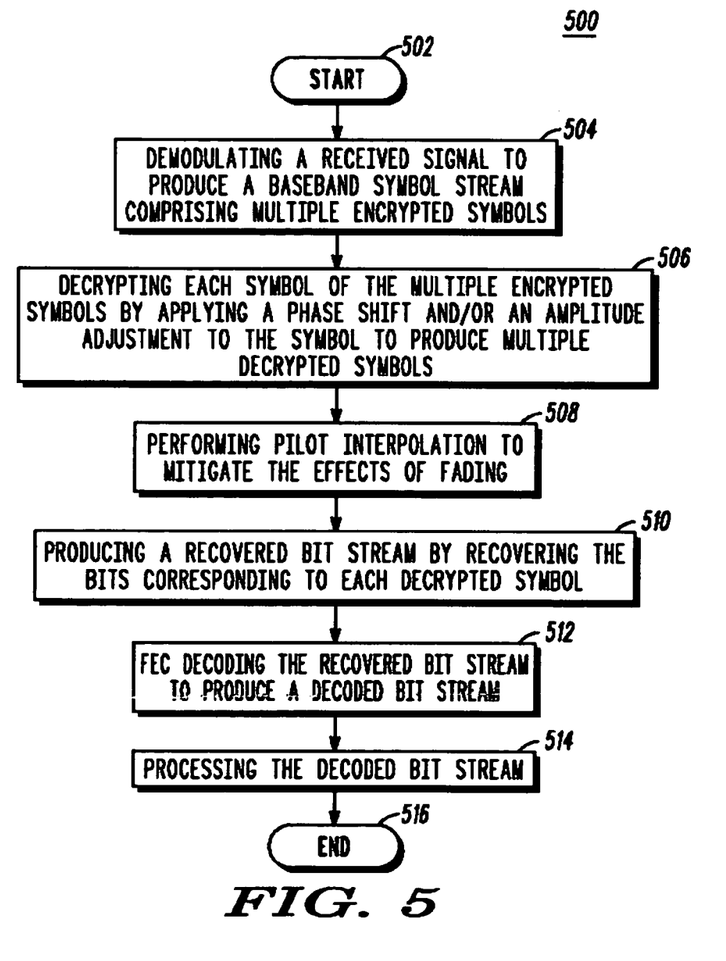
FIG. 5 is a logic flow diagram illustrating an operation of the receiving communication device of FIG. 2 in accordance with an embodiment of the present invention.

Referring now to FIG. 5, a logic flow diagram 500 is depicted that illustrates an operation of receiving communication device 250 in communication system 100 in accordance with an embodiment of the present invention. Receiving communication device 250 implements the reverse functions with respect to transmitting communication device 202. Logic flow 500 begins (502) when an antenna 252 of receiving communication device 250 receives the modulated carrier transmitted by transmitting communication device 202 and routes the received modulated carrier to a receiver section 260 of the receiving communication device. Receiver section 260 comprises a demodulator 264 and may further comprise a low noise amplifier (LNA) 262 coupled to the demodulator. When receiver section 260 receives the modulated carrier, the receiver section routes the received signal to LNA 262, which amplifies the modulated carrier and routes the amplified received signal to demodulator 264. Demodulator 264 demodulates (504) the amplified signal by removing the carrier to produce a baseband, encrypted symbol stream comprising multiple encrypted symbols. Demodulator 264 then routes baseband, encrypted symbol stream to signal processing unit 270 of receiving communication device 250.

Signal processing unit 270 routes the baseband, encrypted symbol stream to amplitude and phase adjuster 272. Amplitude and phase adjuster 272 decrypts (506) each encrypted symbol by applying a phase and/or amplitude adjustment to the encrypted symbol that compensates for the phase and/or amplitude adjustment added to the symbol by amplitude and phase adjuster 210, thereby producing multiple decrypted symbols. For example, in one embodiment of the present invention, amplitude and phase adjuster 272 may subtract, from the phase of the symbol, a phase shift equivalent to the phase shift applied to the symbol by amplitude and phase adjuster 210. In another embodiment of the present invention, amplitude and phase adjuster 272 may add, to the phase of the symbol, a phase shift that will complete a 360° rotation of the symbol around the complex plane, that is, may apply a phase shift approximately equal to '360°-θ'. For example, if amplitude and phase adjuster 210 applied a 202.5° phase shift to the symbol, then amplitude and phase adjuster 272 may apply a phase shift of approximately '360°-202.5°,' or 157.5°, to the symbol. Similarly, amplitude and phase adjuster 272 applies to the encrypted symbol an amplitude adjustment that is the inverse of the amplitude adjustment applied by amplitude and phase adjuster 210.

The phase and/or amplitude adjustment implemented by amplitude and phase adjuster 272 is based on a same code word as the code word used to determine the corresponding phase and/or amplitude adjustment in amplitude and phase adjuster 210. The code word is generated by code word generator 280 coupled to amplitude and phase adjuster 272. Code word generator 280 operates similar to code word generator 212 and generates the code word based on the session key and may further generate the code word based on the time slot number, which session key and time slot number are maintained in at least one memory device 290 of receiving communication device 250.

When the communication session between transmitting communication device 202 and receiving communication device 250 is first set up, signal processing unit 270 initializes code word generator 280 by inputting the session key, or a string of bits derived from the session key, and may further input the time slot number, or a string of bits derived from the time slot number, into the code word generator. For each symbol then input into amplitude and phase adjuster 272, the amplitude and phase adjuster then reads 'n,' or 'n+m,' bits of the code word generated by code word generator 280, which values 'n' and 'm' are maintained in the at least one memory device 290 of the receiving communication device 250. Amplitude and phase adjuster 272 then determines a phase shift and/or an amplitude adjustment based on the 'n,' or 'n+m,' bits, and applies the determined phase shift and/or an amplitude adjustment to the symbol to produce a decrypted symbol. After the communication session is set up, each time receiving communication device 250 receives a new frame, signal processing unit 270 re-initializes code word generator 280 so that the first, in time, symbols decrypted from the new frame are decrypted based on the re-initialized code word generator.

Similar to amplitude and phase adjuster 210, amplitude and phase adjuster 272 may comprise a buffer that stores the code word output by code word generator 280 and from which the amplitude and phase adjuster may read the 'n,' or 'n+m', bits.

Amplitude and phase adjuster 272 then routes the multiple decrypted symbols to pilot interpolation function 274. In order to mitigate the effects of fading, pilot interpolation function 274 performs pilot interpolation on the multiple decrypted symbols based on received apriori signals, such as pilot signals and synchronization signals, as is know in the art. Pilot interpolation function 274 then routes the fading corrected multiple decrypted symbols to inverse symbol mapper 276. Inverse symbol mapper 276 corresponds to, and performs an inverse function of, symbol mapper 208. Inverse symbol mapper 276 produces (510) a recovered bit stream by recovering the P-tuple corresponding to each symbol based on the symbol mapping scheme used by symbol mapper 208. Inverse symbol mapper 276 then conveys the recovered bit stream to decoder 278, preferably an FEC decoder. Decoder 278 decodes (512) the recovered bit stream based on the encoding algorithm used by encoder 206 to produce a decoded bit stream. The decoded bit stream is then further processed (514) by receiving communication device 250 in accordance with well known signal processing techniques and logic flow 500 ends (516). In other embodiments of the present invention, receiving communication device 250 may not include a decoder or may further include de-interleavers, depending upon the features of transmitting communication device 202.

By applying at least one of a phase shift and an amplitude adjustment to each symbol of multiple symbols that are to be transmitted via a wireless link, transmitting communication device 202 provides physical layer encryption that enhances the prior art encryption of data transmitted over a wireless link. The addition of physical layer encryption to the Layer 2 or Layer 3 encryption of the prior art makes the data more secure against decryption by an intercepting communication device that either intercepts the session key or that attempts to decrypt the data by application of brute force.

Figure 6:
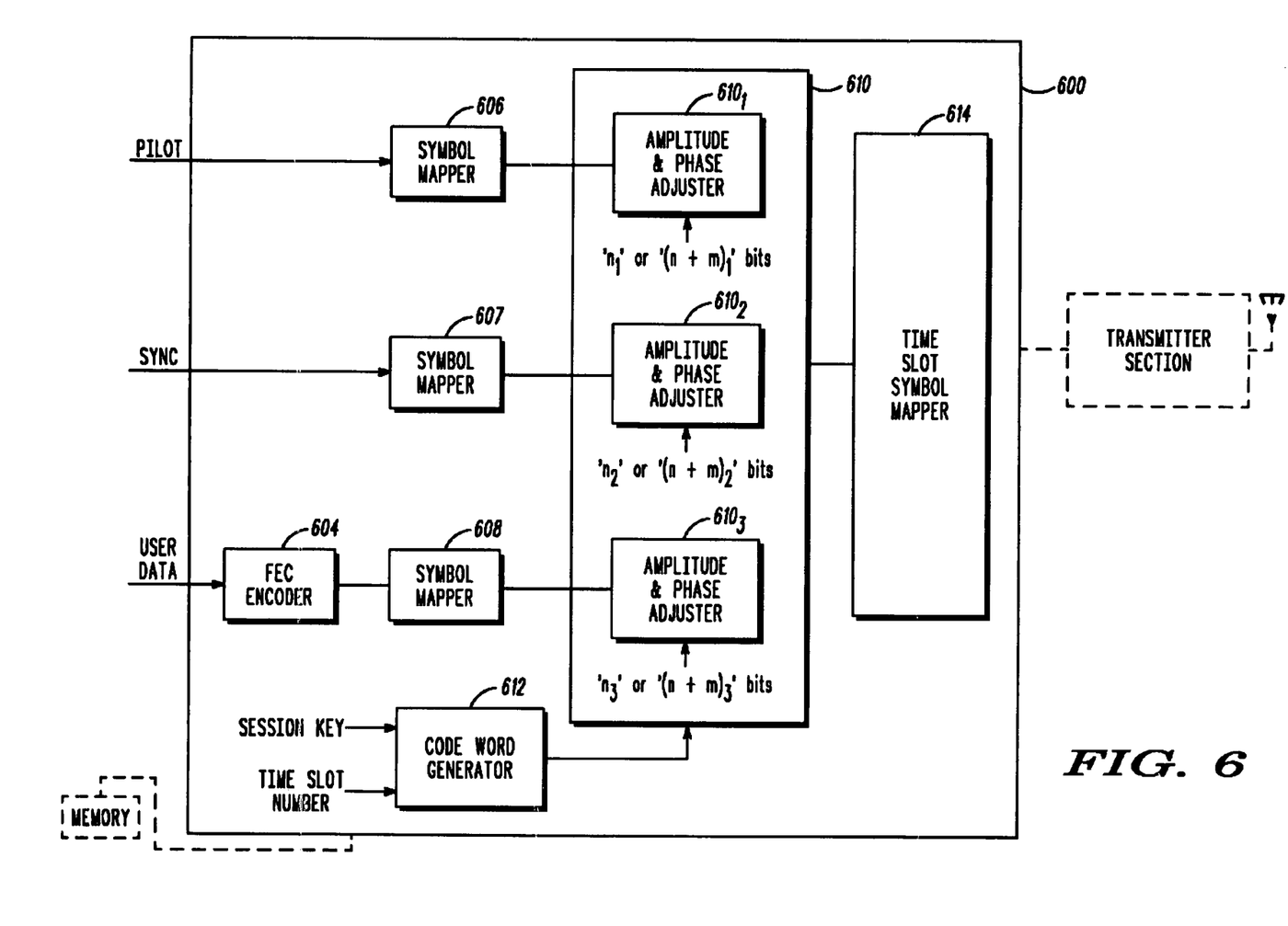
FIG. 6 is a block diagram of a signal processing unit of a transmitting communication device in accordance with another embodiment of the present invention.

In another embodiment of the present invention, a Time Division Multiple Access (TDMA) embodiment, a signal processing unit of a transmitting communication device may further comprise components for separately processing, and inserting in a time slot, various data-types such as pilot data, synchronization data, and user data. Referring now to FIG. 6, a block diagram is provided of a signal processing unit 600 of a transmitting communication device in accordance with a TDMA embodiment of the present invention. Signal processing unit 600 provides for parallel processing of multiple types of data, such as pilot data, synchronization data, and user data. In order to provide parallel processing, signal processing unit 600 includes multiple symbol mappers and multiple amplitude and phase adjusters for a processing of the multiple types of data An encoder 604, preferably an FEC encoder, receives a bit stream associated with the user data. Encoder 604 operates similarly encoder 206 and encodes the data received by the encoder as described above with respect to encoder 206 to produce encoded data. The type of encoder is not critical to, nor is specific encoding necessary for, the present invention.

Encoder 604 conveys the encoded data produced by the encoder to one of multiple symbol mappers 606-608 (three shown), such as symbol mapper 608. The other types of data, such as the pilot data and synchronization data, are directly conveyed to other symbol mappers of the multiple symbol mappers 606-608, such as symbol mappers 604 and 606. Each symbol mapper 606-608 operates similarly to symbol mapper 208 and maps the data received by the symbol mapper to one of multiple symbols included in a constellation of symbols to produce a symbol stream corresponding to the encoded data. In another embodiment of the present invention, the data stream entered into encoder 604 may be entered directly to symbol mapper 608 rather than via encoder 604. In yet another embodiment of the present invention, signal processing unit 204 may further include multiple interleavers that each interleaves encoded data prior to the encoded data being conveyed by an encoder to a corresponding symbol mapper.

Each symbol mapper 606-608 then conveys the symbol stream produced by the symbol mapper to an amplitude and phase adjuster unit 610. Amplitude and phase adjuster unit 610 comprises multiple amplitude and phase adjusters 6101-6103 (three shown), with an amplitude and phase adjuster allocated for each corresponding data type and associated symbol mapper 606-608. Amplitude and phase adjuster unit 610 is coupled to a code word generator 612, and each amplitude and phase adjuster of the multiple amplitude and phase adjusters $610_1$-$610_3$ applies a phase shift to each symbol received by the amplitude and phase adjuster based on a code word output by the code word generator to produce an encrypted, phase shifted symbol.

Preferably, each amplitude and phase adjuster $610_1$-$610_3$ operates similarly to amplitude and phase adjuster 210, and code word generator 612 operates similarly to code word generator 212. A first 'n' bits, that is, '$n_1$' bits, or a first 'n+m' bits, that is, '$(n+m)_1$' bits, of the code word output by code word generator 612 is provided by signal processing unit 600, and more particularly amplitude and phase adjuster unit 610, to a first amplitude and phase adjuster, such as amplitude and phase adjuster $610_1$, of the multiple amplitude and phase adjusters. A second, different 'n' bits, that is, '$n_2$' bits, or a second, different 'n+m' bits, that is, '$(n+m)_2$' bits, of the code word output by code word generator 612 is provided by amplitude and phase adjuster unit 610 to a second amplitude and phase adjuster, such as amplitude and phase adjuster $610_2$, of the multiple amplitude and phase adjusters. And a third, different 'n' bits, that is, '$n_3$' bits, or a third, different 'n+m' bits, that is, '$(n+m)_3$' bits, of the code word output by code word generator 612 is provided by amplitude and phase adjuster unit 610 to a third amplitude and phase adjuster, such as amplitude and phase adjuster $610_3$, of the multiple amplitude and phase adjusters. For each symbol next input into a same amplitude and phase adjuster $610_1$-$610_3$, yet another, different 'n,' or 'n+m,' bits of the code word output by code word generator 612 is provided to the amplitude and phase adjuster. However, in another embodiment of the present invention, a amplitude and phase adjuster operating on synchronization symbols, such as amplitude and phase adjuster $610_2$, may apply a same phase shift to all synchronization symbols in order to maximize autocorrelation values associated with the synchronization symbols in a receiving communication device. Amplitude and phase adjuster unit 610 may further comprise a buffer that stores the code word output by code word generator 612 and from which the amplitude and phase adjuster unit may read the 'n,' or 'n+m', bits provided to each amplitude and phase adjuster $610_1$-$610_3$.

Figure 7:
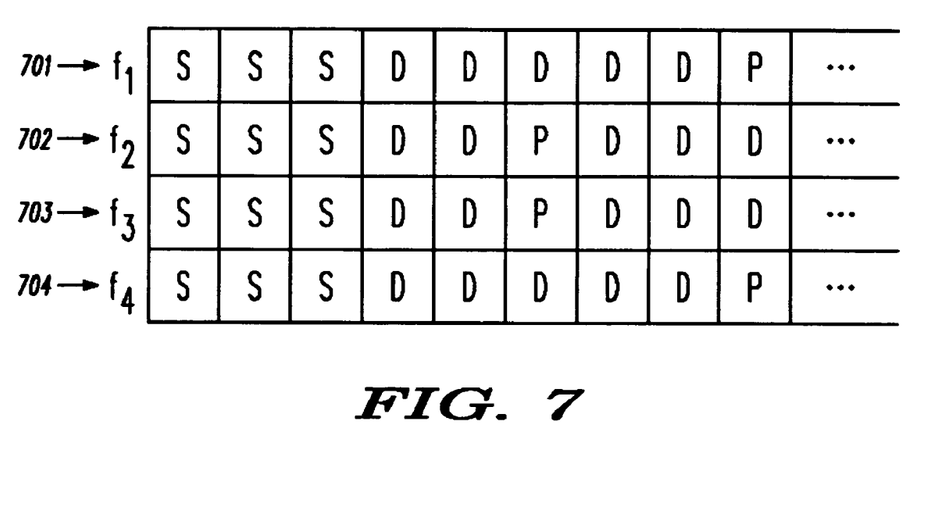
FIG. 7 is a block diagram of an exemplary time slot in accordance with another embodiment of the present invention.

Each amplitude and phase adjuster $610_1$-$610_3$ then conveys each phase and/or amplitude adjusted symbol produced by the amplitude and phase adjuster to a time slot symbol mapper 614. Time slot symbol mapper 614 maps each phase and/or amplitude adjusted symbol received from an amplitude and phase adjuster $610_1$-$610_3$ to an appropriate block in a time slot. For example, FIG. 7 is a block diagram of an exemplary time slot 700 that may be utilized in the TDMA embodiment of the present invention. During a time slot, an assigned user of the time slot is entitled to use the full spectrum of an associated radio frequency (RF) signal. As depicted in FIG. 7, time slot 700 comprises four frequency sub-channels 701-704, that is, four signal paths that are each mixed with a signal at a separate offset frequency to produce a frequency sub-channel of the assigned RF spectrum. Each sub-channel 701-704 is offset from the other sub-channels due to the frequency offsets of the mixing signals. For example, time slot 700 may be an "iDEN" time slot used by "iDEN" wireless system equipment available from Motorola, Inc., of Schaumburg, Ill. Each sub-channel 701-704 in time slot 700 may contain 53 symbol positions, for a total of 212 symbol positions in the entire time slot 700. Time slot symbol mapper 614 may then interleave three synchronization symbols in the first three symbol positions (which symbol positions are depicted in time slot 700 by an 'S') of each sub-channel 701-704 and further interleave the pilot symbols with the user data symbols in predetermined symbol positions (which symbol positions respectively are depicted in time slot 700 by a 'P' and a 'D') in each sub-channel 701-704.

Time slot symbol mapper 614 then routes the time slot to a transmitter section, where the time slot is modulated onto radio frequency (RF) sub-channels and the modulated signals are amplified to produce amplified RF signals that are transmitted to a receiving communication device.

Figure 8:
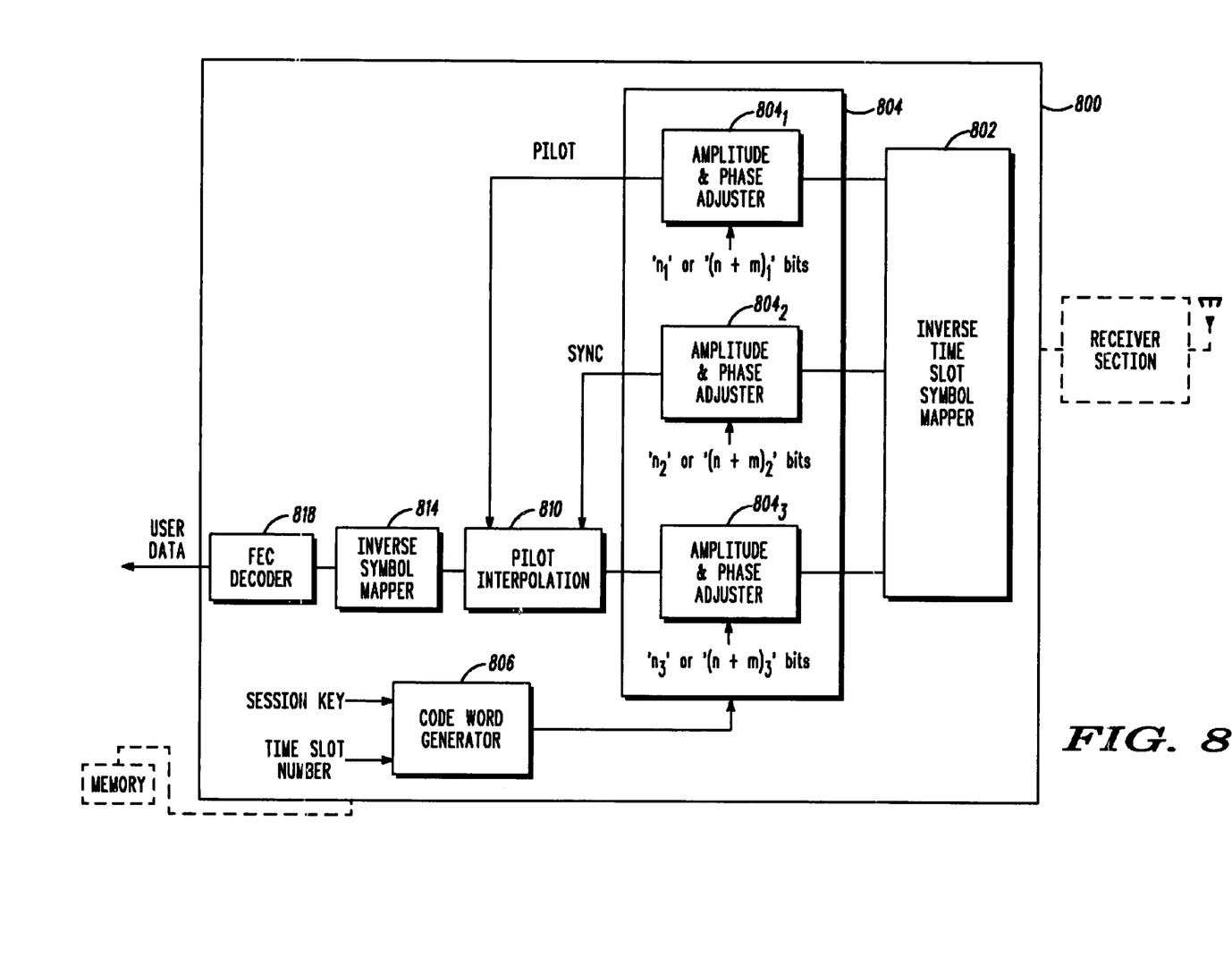
FIG. 8 is a block diagram of a signal processing unit of a receiving communication device in accordance with another embodiment of the present invention.

Similarly, in the TDMA embodiment, a signal processing unit of a receiving communication device may correspondingly comprise components for separately processing various data-types such as pilot data, synchronization data, and user data, transmitted by the corresponding transmitting communication device. Referring now to FIG. 8, a block diagram is provided of a signal processing unit 800 of a receiving communication device in accordance with the TDMA embodiment of the present invention. Signal processing unit 800 implements the reverse functions with respect to signal processing unit 600. More particularly, signal processing unit 800 comprises an inverse time slot symbol mapper 802 that receives a time slot that has been downconverted to baseband by a demodulator of a receiver section of the receiving communication device and de-interleaves the symbols positioned in the symbol positions of the time slot. Inverse time slot symbol mapper 802 then routes each symbol to an amplitude and phase adjuster unit 804.

Amplitude and phase adjuster unit 804 comprises multiple amplitude and phase adjusters $804_1$-$804_3$ (three shown), with an amplitude and phase adjuster allocated for each corresponding data type, such as pilot data, synchronization data, and user data, and associated inverse symbol mapper 812-814. Amplitude and phase adjuster unit 804 is coupled to a code word generator 806 that operates similar to code word generator 280 and sources one or more code words to amplitude and phase adjuster unit 804. Each amplitude and phase adjuster $804_1$-$804_3$ then decrypts each symbol received by the amplitude and phase adjuster by applying a phase shift and/or an amplitude adjustment to the symbol based on the one or more code words sourced by code word generator 806 to produce a decrypted symbol. Preferably, each amplitude and phase adjuster $804_1$-$804_3$ operates similarly to amplitude and phase adjuster 272. Further, amplitude and phase adjuster unit 804 operates similar to amplitude and phase adjuster unit 610 in that the amplitude and phase adjuster unit provides different 'n,' or 'n+m,' bits to each different amplitude and phase adjuster $804_1$-$804_3$ and further to each same amplitude and phase adjuster for each different symbol received by the amplitude and phase adjuster. However, in another embodiment of the present invention, an amplitude and phase adjuster operating on synchronization symbols, such as amplitude and phase adjuster $804_2$, may apply a same phase shift to all synchronization symbols, depending upon the phase shift applied to the synchronization symbols by the corresponding amplitude and phase adjuster in the transmitting communication device. Amplitude and phase adjuster unit 804 may further comprise a buffer that stores a code word output by code word generator 806 and from which the amplitude and phase adjuster reads the 'n,' or 'n+m', bits provided to each amplitude and phase adjuster $804_1$-$804_3$.

Each amplitude and phase adjuster $804_1$-$804_3$ then routes each adjusted symbol produced by the amplitude and phase adjuster to a pilot interpolation function 810. Pilot interpolation function 810, similar to pilot interpolation function 274, performs pilot interpolation on each adjusted user data symbol received by the pilot interpolation function based on received apriori data, such as the pilot data and the synchronization data, as is known in the art. Pilot interpolation function 810 may then drop the received pilot data and synchronization data and routes each fading corrected adjusted symbol corresponding to received user data to an inverse symbol mapper 814, which inverse symbol mapper perform an inverse function of the function performed by each of symbol mappers 606-608. That is, inverse symbol mapper 814 operates similarly to inverse symbol mapper 276 and recovers the P-tuple corresponding to the decrypted symbol to produce a recovered bit stream corresponding to the received user data. Inverse symbol mapper 814 then conveys the recovered bit stream to a decoder 818, preferably an FEC decoder, which decoder operates similarly to decoder 278 and decodes the recovered bit stream to produce a decoded bit stream. The decoded bit stream is then further processed by the receiving communication device in accordance with well known signal processing techniques. Again, similar to signal processing unit 270, in other embodiments of the present invention, signal processing unit 800 may not include decoder 818 or may further include multiple de-interleavers, depending upon the features of the corresponding transmitting communication device.

Again, by applying at least one of a phase shift and an amplitude adjustment to each symbol of multiple symbols that are to be transmitted via a wireless link, a transmitting communication device is provided that provides physical layer encryption that enhances the prior art encryption of data transmitted over a wireless link. When multiple types of data, for example, pilot data, synchronization data, and user data, are being concurrently transmitted, the transmitting communication device may separately encrypt the symbols of each data stream in order to customize the encryption of each data stream. In another embodiment of the present invention, a receiving communication device is provided that is able to decrypt the encrypted symbols by applying at least one of a phase shift and an amplitude adjustment to each encrypted symbol that corresponds to a phase shift or an amplitude adjustment applied to the symbol by the transmitting communication device.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for encrypting a wireless transmission comprising:

receiving, from a symbol mapper, a plurality of symbols, wherein each symbol of the plurality of symbols is associated with a point in a constellation of points;

generating an encryption code word;
applying at least one of a phase shift and an amplitude adjustment based on the encryption code word to an entirety of each symbol of the plurality of symbols to produce a plurality of adjusted symbols; and
transmitting the plurality of adjusted symbols via a wireless link.

2. The method of claim 1, wherein transmitting comprises:
modulating the plurality of adjusted symbols onto a radio frequency carrier to produce a modulated carrier; and
transmitting the modulated carrier via a wireless link 3. The method of claim 1, wherein receiving a symbol comprises:
receiving a bit stream; and
mapping the bit stream to a constellation of symbols to produce a plurality of symbols.

4. The method of claim 1, wherein the bit stream comprises at least one of pilot bits, synchronization bits, and user data bits.

5. The method of claim 1, wherein transmitting comprises:
mapping each adjusted symbol of the plurality of adjusted symbols to a symbol position in a time slot;
modulating the symbols in the time slot to produce a modulated time slot; and
transmitting the modulated time slot.

6. The method of claim 1, wherein the encryption code word is based on at least one of a session key and a time slot number.

7. The method of claim 1, wherein an at least one of a phase shift and an amplitude adjustment applied to a first symbol of the plurality of symbols is different than an at least one of a phase shift and an amplitude adjustment applied to a second symbol of the plurality of symbols.

8. A method for receiving an encrypted wireless transmission comprising:
receiving a plurality of encrypted symbols via a wireless link, wherein each symbol of the plurality of encrypted symbols has been encrypted by an application of at least one of a phase shift and an amplitude adjustment to an entirety of the symbol;
generating an encryption code word;
applying at least one of a phase shift and an amplitude adjustment based on the encryption code word to an entirety of each encrypted symbol of the plurality of encrypted symbols to produce a plurality of decrypted symbols, wherein each symbol of the plurality of decrypted symbols is associated with a point in a constellation of points; and
applying the plurality of decrypted symbols to a symbol demapper.

9. The method of claim 8, wherein receiving comprises:
receiving a signal; and
down converting the received signal to produce a baseband symbol stream comprising a plurality of encrypted symbols.

10. The method of claim 8, further comprising mapping each decrypted symbol of the plurality of decrypted symbols to a constellation of symbols to produce a bit stream.

11. The method of claim 8, wherein the bit stream comprises at least one of pilot bits, synchronization bits, and user data bits.

12. The method of claim 8, wherein receiving comprises:
receiving a modulated time slot;
demodulating the received time slot to produce a demodulated time slot; and
de-mapping each symbol position in the demodulated time slot to produce a plurality of encrypted symbols.

13. The method of claim 8, wherein the encryption code word is based on at least one of a session key and a time slot number.

14. The method of claim 8, wherein an at least one of a phase shift and an amplitude adjustment applied to a first encrypted symbol of the plurality of encrypted symbols is different than an at least one of a phase shift and an amplitude adjustment applied to a second encrypted symbol of the plurality of encrypted symbols.

15. A communication device comprising:
a symbol mapper that receives a bit stream comprising a plurality of bits and maps the plurality of bits to a plurality of symbols, wherein each symbol of the plurality of symbols is associated with a point in a constellation of points;
a code word generator that generates an encryption code word; and
an amplitude and phase adjuster that receives the plurality of symbols from the symbol mapper and the encryption code word from the code word generator and encrypts each symbol by applying at least one of a phase shift and an amplitude adjustment based on the code word to an entirety of each symbol of the plurality of symbols to produce a plurality of adjusted symbols for transmission over a wireless link.

16. The communication device of claim 15, wherein the communication device further comprises a modulator that modulates the plurality of adjusted symbols onto a radio frequency carrier to produce a modulated carrier for transmission over a wireless link.

17. The communication device of claim 15, wherein the symbol mapper comprises a first symbol mapper and wherein the communication device further comprises:
a second symbol mapper that receives the plurality of adjusted symbols and maps each adjusted symbol of the plurality of adjusted symbols to a symbol position in a time slot;
a modulator that modulates the symbols in the time slot to produce a modulated time slot; and
a power amplifier that amplifies the modulated time slot to produce an amplified time slot for transmission over a wireless link.

18. The communication device of claim 15, wherein the communication device further comprises at least one memory device that maintains at least one of a session key and a time slot number and wherein the code word generator generates the encryption code word based on the at least one of a session key and a time slot number.

19. A communication device comprising:
a code word generator that generates an encryption code word;
an amplitude and phase adjuster that receives plurality of encrypted symbols that have been transmitted over a wireless link, wherein each symbol of the plurality of encrypted symbols has been encrypted by an application of at least one of a phase shift and an amplitude adjustment to an entirety of the symbol, receives the encryption code word from the code word generator, and applies at least one of a phase shift and an amplitude adjustment based on the encryption code word to an entirety of each encrypted symbol of the plurality of encrypted symbols to produce a plurality of decrypted symbols; and
an inverse symbol mapper that receives the plurality of decrypted symbols and maps each decrypted symbol of the plurality of decrypted symbols to a point in a constellation to produce a bit stream.

20. The communication device of claim 19, wherein the communication device further comprises a demodulator that downconverts the received signal to produce a baseband symbol stream comprising the plurality of encrypted symbols.

21. The communication device of claim 19, wherein the symbol mapper comprises a first symbol mapper and wherein the communication device further comprises:

a demodulator that receives a time slot that has been transmitted over the wireless link and demodulates the time slot to produce a demodulated time slot; and a second symbol mapper that receives the demodulated time slot and de-interleaves the time slot to produce the plurality of encrypted symbols.

22. The communication device of claim 19, wherein the communication device further comprises at least one memory device that maintains at least one of a session key and a time slot number and wherein the at least one of a phase shift and an amplitude adjustment is based on the at least one of a session key and a time slot number.

* * * * *